May 27, 1930.  P. P. HORNI  1,760,061
PARACHUTE SAFETY SUSPENSION FOR AEROPLANES
Filed Jan. 21, 1928   4 Sheets-Sheet 1

INVENTOR
Paul P. Horni
BY
Knight Bros
ATTORNEYS

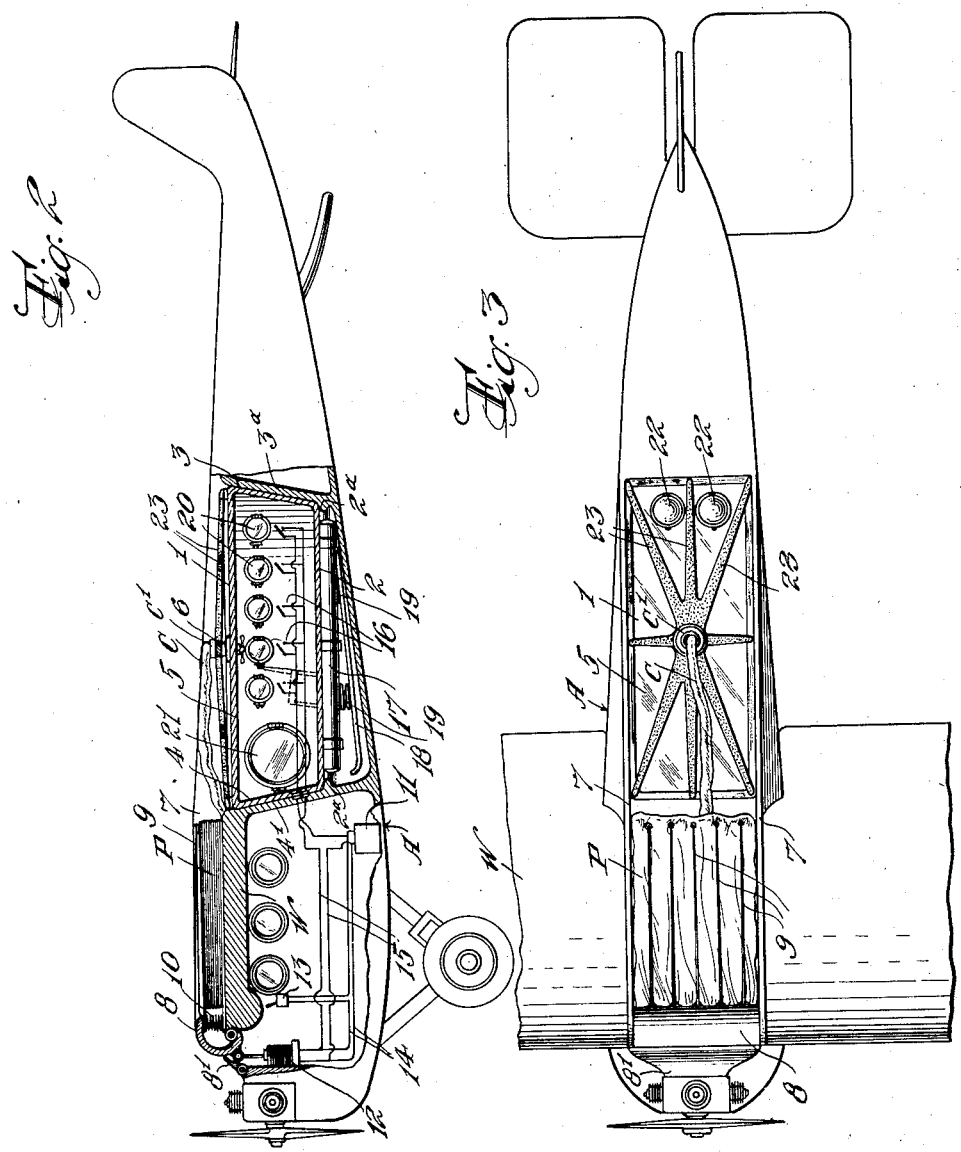

May 27, 1930.  P. P. HORNI  1,760,061
PARACHUTE SAFETY SUSPENSION FOR AEROPLANES
Filed Jan. 21, 1928  4 Sheets-Sheet 3
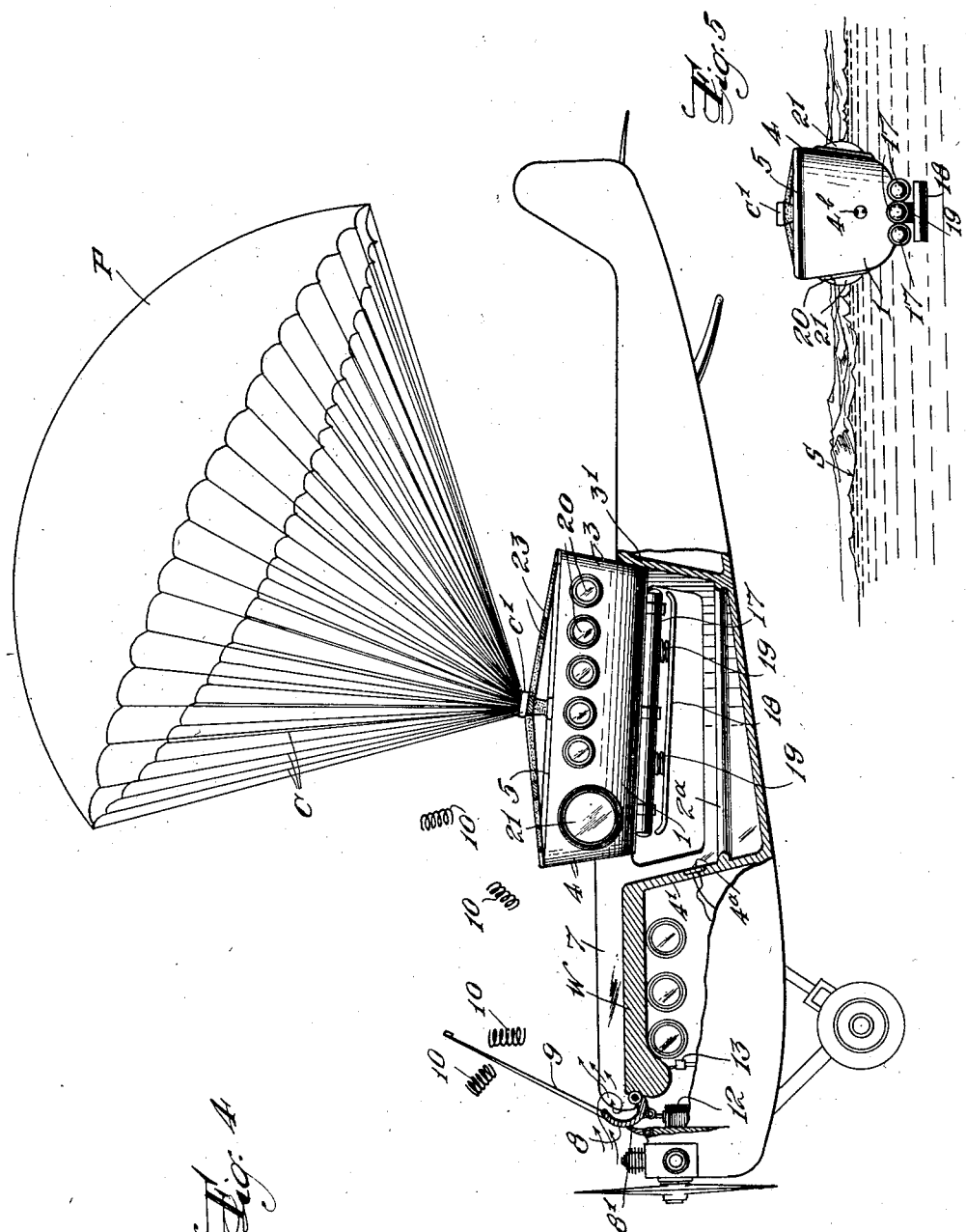

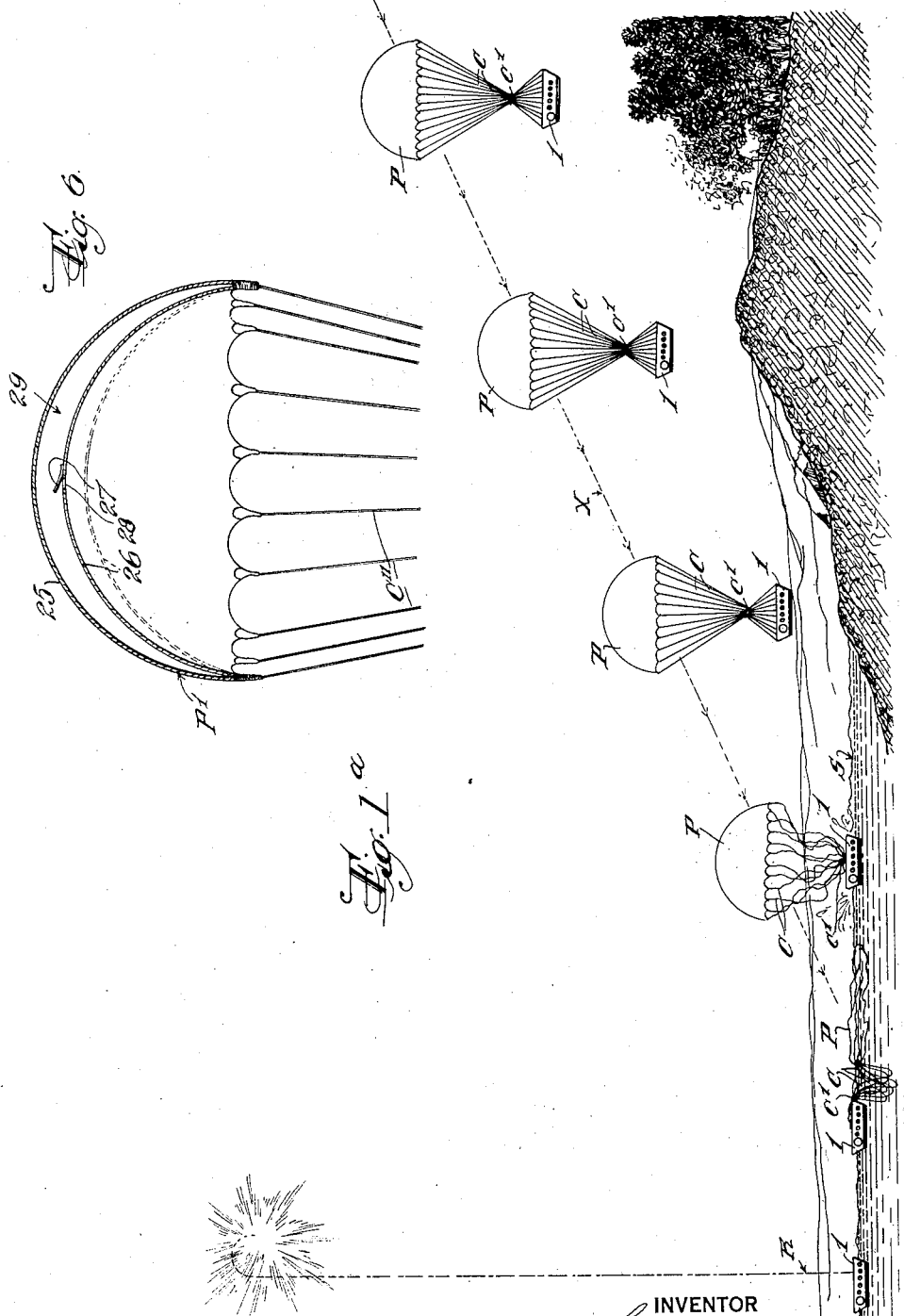

Patented May 27, 1930

1,760,061

UNITED STATES PATENT OFFICE

PAUL P. HORNI, OF NEWARK, NEW JERSEY

PARACHUTE SAFETY SUSPENSION FOR AEROPLANES

Application filed January 21, 1928. Serial No. 248,407.

This invention relates to means for saving lives from aeroplanes by means of a separate carrier for passengers that is securely nested in the plane and that has a parachute for lifting it free of the plane in case of accident. When the parachute is released the speed of the plane makes the take-off extremely hazardous unless proper precautions are taken to prevent the speed of the plane from either preventing the parachute from opening or from getting entangled in the rear parts of the plane.

By making the carrier for passengers or other load separate from the part of the fuselage occupied by the pilot, not only is the safety of the passengers first taken care of but the plane, being lightened by that much weight, may be successfully landed by the pilot; or he in any event may save himself by the ordinary provisions that he has for that purpose as, for example, an individual parachute.

The object of the present invention is to produce a combination of plane, carrier and parachute that will insure the maximum safety in the take-off.

I have found that this may best be accomplished by a disposition of the parachute when in its folded or collapsed condition forward of the carrier. When the parachute is so located, it will, when released, inflate itself as it passes up over the carrier, being for a moment free of all drag from the carrier and by the time it has tautened up the suspension lines it will be sufficiently distended to make the lifting of the carrier free of the plane as safe as possible.

A further object of the invention is to make the carrier of such a construction as will provide greater immunity from injury to the occupants when landing both on land or water or in case the plane should crash without the carrier being previously liberated. To accomplish this object, I make the carrier a rigid boat that will float in water and that has resilient means for easing the effect of landing on land. Such a boat, in case of a crash, will itself take up considerable of the force of impact and lessen the chances of injury to the occupants of the carrier. Such a carrier may easily be sealed against invasion of water and may carry fresh water and food for use in case the stay at sea is prolonged.

The combination by which these and other objects are accomplished will be best understood by a description of an embodiment of the invention as illustrated in the accompanying drawings, in which:

Figures 1 and 1ª represent the flight of an aeroplane that is about to crash and the release and flight of a parachute and passenger carrier therefrom.

Figure 2 is a vertical longitudinal section of an aeroplane equipped with my invention.

Figure 3 is a plan view of the same.

Figure 4 is a longitudinal section and side elevation of a plane and parachute showing the parachute leaving the plane.

Figure 5 shows an end view of the carrier after it has alighted on the water.

Figure 6 is a vertical section through the bag of the parachute in its distended form, showing the double envelope.

Figure 1:
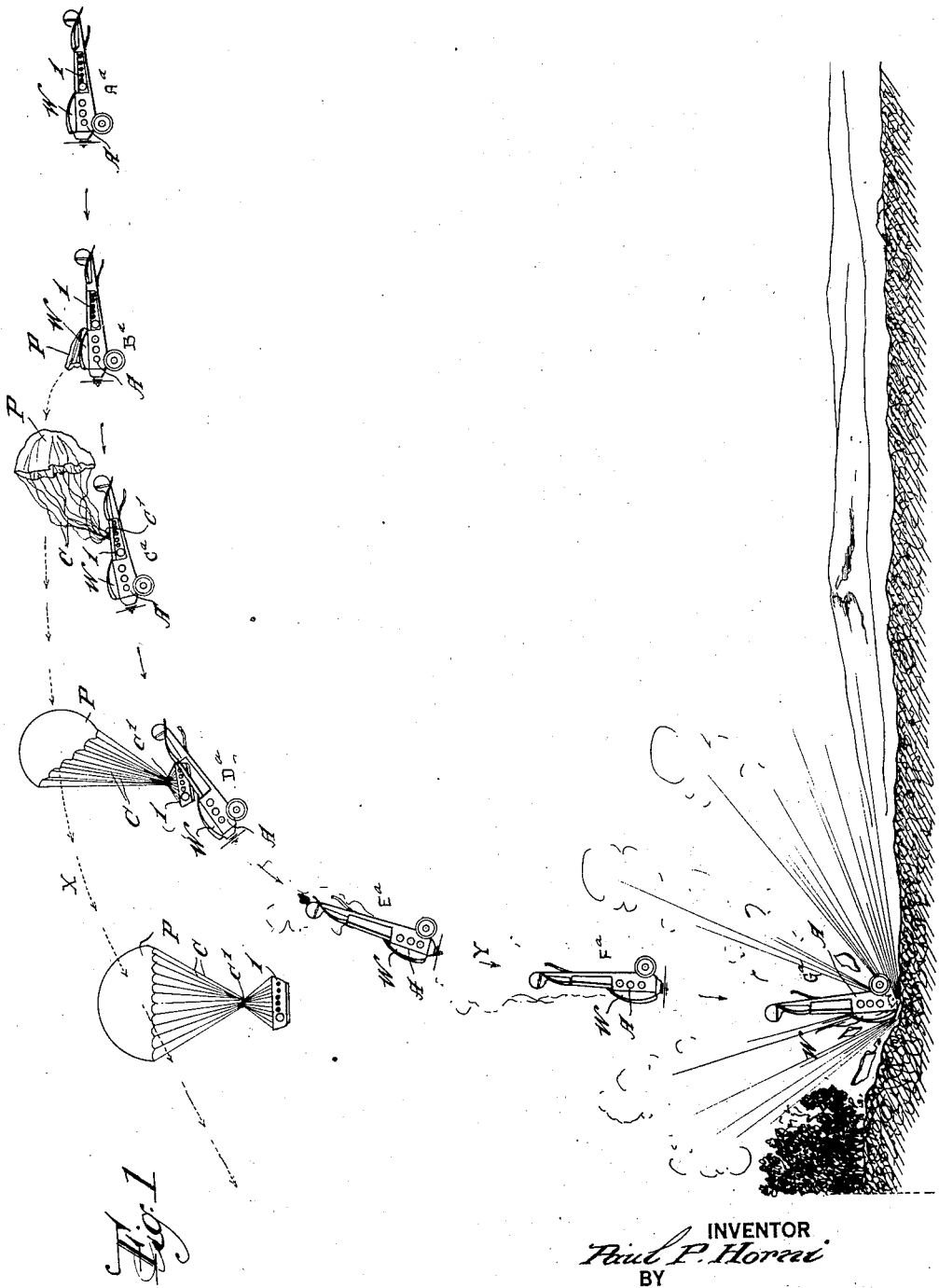

Referring to Figure 1, there is shown at the right hand end of the figure at Aa an aeroplane in normal flight having a body A, a passenger container 1 and wings W. At Ba the plane is shown as at the moment when the pilot has started to release the parachute P and carry the container 1 away from the plane either to lighten the plane or avoid injury to passengers in the carrier because the plane is expected to crash. At Ca the next position is shown with the parachute P beginning to inflate as it sweeps over the plane, due to the velocity of the plane and the suspension cords C from the parachute to the container 1 beginning to straighten out. At Da the next step is shown with the parachute just lifting the container from its pocket in the aeroplane. At Ea, Fa and Ga the progress of the plane towards a crashing position on the earth is illustrated. After leaving the plane, the parachute is shown proceeding on a course indicated by the dotted line X until it reaches the point where it either alights on the earth or on the water. The illustration shows it alighting on the water S. Means are provided for disconnecting the parachute from the container 1 after it alights and as the container is made water-tight it then becomes a boat to float, from which rescue may be obtained by sending up signals, as indicated at R.

Referring to Figure 2, the fuselage of the aeroplane is shown as provided with a pocket 3ª in which a carrier for passengers or freight is shown at 1. It is preferably located just rear of the pilot's cabin. The back 3 and front 4, as well as the sides of the carrier, are preferably made inclined to facilitate the easy release of the carrier from the plane. The carrier may have a top 5 which may be made sea-proof. Attached to the carrier at 6 are the cords C through the medium of a connecter C' and elastic suspension members 23. The side walls of the plane's fuselage are shown extended upward as at 7, which together with a hinged arm 8, form a box in which the folded canopy of the parachute P is securely held by means of prongs 9 extending rearwardly from the pivoted arm 8. A pivoted bar 8' lays against the arm 8 and prevents air rushing in under the same. Springs 10 are provided to throw up the pivot arm 8 with its hinge 9 when released by the pilot or other person. At 11 is shown a battery or source of electricity, the circuits of which include a solenoid 12 operating to hold the springs 10 compressed and at 13 is shown a switch for opening the circuit of the solenoid or closing it as the case may be, to cause the magnet 12 to release the arm 8. The circuits are shown at 14 and at 15 is shown an additional circuit connecting with switches 16 in the container whereby occupants of the container may cause the release of the parachute.

Necessary, contacts in the partition 4ª and 4ᵇ (see Figures 4 and 5) serve to make the circuit complete between the plane and the carrier when the carrier is in its normal position resting on supports 2ª. At 17 are shown reservoirs or containers that may, for example, be filled with water or food for use when the container alights at sea and that also may act as buoyant members, and at 18 are shown skids attached to the bottom of the container by springs 19 which serve as elastic bumpers in case the container lands on the earth. The rear spring 19 also serves to facilitate the quick release of the container from the areoplane the moment tension is exerted on the parachute shrouds C. 20 represents port holes which may be closed water-tight and 21 is a water-tight door. 22 are doors which may be used for openings for passengers to get out of the carrier when in the water or for letting in air or sending up rockets or the like. At 23 is shown an elastic absorbing connector between the shrouds C and the container. It may be made of india rubber. As it is sometimes desirable to have the parachute not sink in the event of its falling in the water, I have shown in Figure 6 how the tops may be made double, 25 being an outside envelope and 26 an inside envelope with a valve 27 opening inward from the latter so as to allow air to pass through orifice 28 and inflate the space 29 between the two envelopes as the parachute descends, as thus air will be trapped in the space 29 when the parachute alights in the water. It will form a buoyant member that will not only save the parachute from sinking but enable the saving of any valuable packages (specie or notes or the like) that may left attached thereto.

I claim:—

1. An aeroplane comprising in combination a fuselage having a compartment for the pilot with the controls for the plane located therein, and a separate compartment, a container adapted to fit closely within said separate compartment, a parachute laid in folded condition on the fuselage forward of the said container, flexible shrouds connecting the said container, to the parachute, means for holding the folded parachute on to the fuselage, means in the pilot's compartment for causing the release of the said holding means.

2. A construction according to claim 1 in which the container has underneath landing skids supported by resilient means, the resilient means being under compression when the container is in the compartment so as to aid in the lifting of the container from the plane.

3. In an aeroplane, the combination comprising a fuselage, a container separable from the fuselage, a parachute having its canopy folded on the top of the fuselage forward of the container, shrouds connecting the canopy with the container, a cover transversely hinged to the fuselage forward of the folded canopy and extending rearwardly over the said canopy with means for holding the cover down upon the canopy to secure it in place on the fuselage, and means for releasing the said holding-down means.

4. In an aeroplane, the combination comprising a fuselage, a container separable from the fuselage, a compartment on the top of the fuselage forward of the container, said compartment having for its bottom the top of the fuselage and for its top a hinged cover transversely pivoted to the fuselage at the front edge of the compartment with means for forcing the cover downwardly, a folded parachute held in the compartment by the downward force of the cover, shrouds connecting the container to the parachute, and means for lifting the cover to allow a free rearward flight of the parachute over the container.

5. In an aeroplane, the combination comprising a fuselage, a container separable from the fuselage, a parachute having its canopy folded on the top of the fuselage forward of the container, shrouds connecting the canopy with the container, a cover transversely hinged to the fuselage forward of the folded canopy and extending rearwardly over the said canopy, means tending to force the cover up, means for holding the cover down upon the canopy to secure the canopy in place on the fuselage, and means for releasing the said holding-down means.

PAUL P. HORNI.